US006888657B2

(12) United States Patent
Barbour et al.

(10) Patent No.: US 6,888,657 B2
(45) Date of Patent: May 3, 2005

(54) MULTIPLE-BIT STORAGE ELEMENT FOR BINARY OPTICAL DISPLAY ELEMENT

(75) Inventors: Michael J. Barbour, Corvallis, OR (US); Andy Van Brocklin, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 103 days.

(21) Appl. No.: 10/352,703

(22) Filed: Jan. 28, 2003

(65) Prior Publication Data

US 2004/0145793 A1 Jul. 29, 2004

(51) Int. Cl.[7] ............................ G02F 1/03; G02B 26/00

(52) U.S. Cl. ........................ 359/242; 359/290; 359/291

(58) Field of Search ................................ 359/242, 241, 359/240, 238, 290, 291, 292, 295; 345/59, 693

(56) References Cited

U.S. PATENT DOCUMENTS 5,729,243 A * 3/1998 Cavallerano et al. ......... 345/59
5,969,710 A * 10/1999 Doherty et al. ............. 345/693
6,702,447 B2 * 3/2004 Wang .......................... 353/98
2004/0001679 A1 * 1/2004 Sisodia et al. ............. 385/120

OTHER PUBLICATIONS

Peter F. Van Kessel et al., A MEMS–based projection display, Proceedings of the IEE, vol. 86, No. 8, Aug. 1998, pp. 1687–1704.

Larry J. Hornbeck, Digital Light Processing and MEMS: Timely convergence for a bright future, Proceedings of SPIE, vol. 2639, 1995, p. 2 et seq.

* cited by examiner

*Primary Examiner*—Timothy Thompson

(57) ABSTRACT

An optical display element of one embodiment of the invention is disclosed that comprises a binary optical display element and a multiple-bit storage element to store a number of bits of a color intensity value to be displayed by the binary optical display element during a display period. Each bit is loaded from the multiple-bit storage element into the binary optical display element one or more times during the display period to achieve the color intensity value.

38 Claims, 8 Drawing Sheets

MULTIPLE-BIT STORAGE ELEMENT FOR BINARY OPTICAL DISPLAY ELEMENT

BACKGROUND

Projectors are generally devices that integrate light sources, optics systems, electronics, and displays for front- or rear-projecting images from computers or video devices. Typical projectors include spatial light modulators (SLM's) to modulate light spatially, so that images are projected onto screens for viewing. Light is transmitted to an SLM, which processes the light so that the desired image pixel is projected onto a screen. SLM's may be reflective in nature. Light is reflected off an SLM, which modifies the light in accordance with the image to be projected onto the screen. The archetypical example of this type of SLM is the digital micromirror device (DMD), which is a kind of microelectromechanical (MEM) device. Projectors using DMD's project bright images, because the light does not have to transmit through the reflective SLM's.

In general, a projector refreshes its pixels with new data based on a refresh rate, or in every display period of $$\frac{1}{\text{refresh rate}}.$$

DMD's, however, are binary optical display elements, meaning that they either reflect light, or do not reflect light, and thus are not receptive to pixels having color depths greater than one bit. For a DMD to project a pixel having an intensity value of more than one bit in color depth, the display period is usually divided into a number of intervals, with each interval usually equal to or less than $$\frac{\text{display period}}{2^{\text{color depth in bits}}-1}.$$

In each interval the DMD is loaded with one of the bits of the intensity value of the pixel, so that it reflects light or does not reflect light in accordance with this bit. Each bit is loaded into the DMD a number of times based on its significance relative to the other bits of the pixel's intensity value.

The projector therefore typically refreshes each of its DMD's every interval of every display period. Each of these intervals is usually specified as no greater than $$\frac{1}{\text{refresh rate}\times(2^{\text{color depth in bits}}-1)}.$$

For a projector having a color depth of eight bits and a refresh rate of sixty hertz (Hz), this means that the projector refreshes each DMD at intervals no longer than about sixty-five microseconds ($\mu$s). However, controlling all the DMD's in a projector in this manner can be difficult, especially for projectors with large resolutions and high refresh rates.

SUMMARY OF THE INVENTION

An optical display element of one embodiment of the invention comprises a binary optical display element and a multiple-bit storage element to store a number of bits of a color intensity value to be displayed by the binary optical display element during a display period. Each bit is loaded from the multiple-bit storage element into the binary optical display element one or more times during the display period to achieve the color intensity value.

BRIEF DESCRIPTION OF THE DRAWINGS

The drawings referenced herein form a part of the specification. Features shown in the drawing are meant as illustrative of only some embodiments of the invention, and not of all embodiments of the invention, unless otherwise explicitly indicated, and implications to the contrary are otherwise not to be made.

DETAILED DESCRIPTION OF THE DRAWINGS

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized and logical, mechanical, and other changes may be made without departing from the spirit or scope of the present invention. The following detailed description is, therefore, not to be taken in a limiting sense, and the scope of the present invention is defined only by the appended claims.

Overview

Figure 1A:
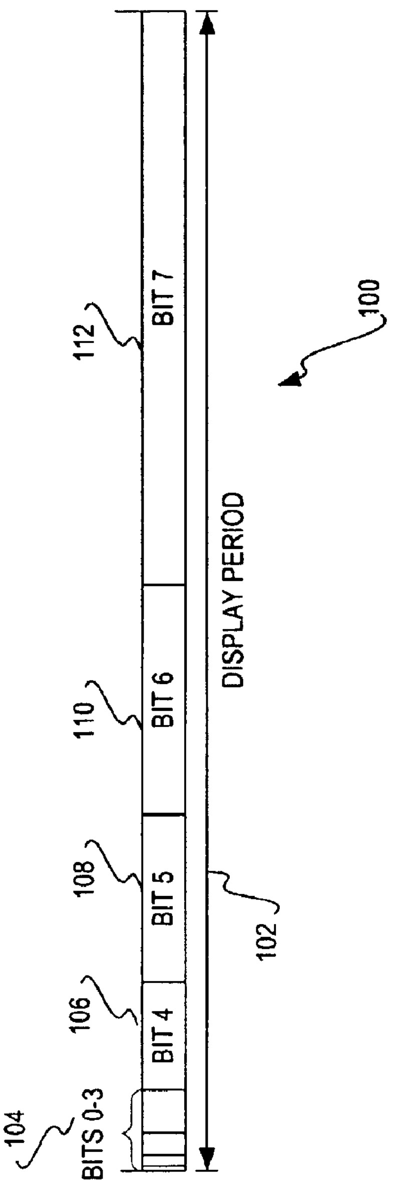
FIGS. 1A and 1B are diagrams of different approaches for loading the bits of a color intensity value of an image pixel into a binary optical display element within a display period to display the image pixel, in accordance with which embodiments of the invention may be implemented.
Figure 1B:
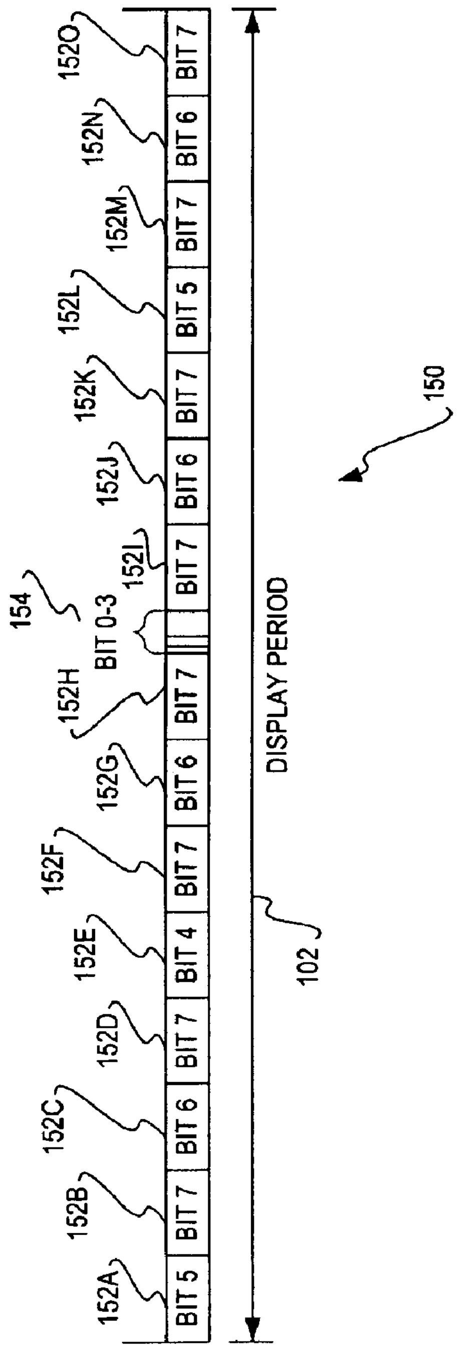

FIGS. 1A and 1B show different approaches 100 and 150, respectively, for loading the bits of a color intensity value of an image pixel into a binary optical display element within a display period 102 to display the image pixel, in accordance with which embodiments of the invention may be implemented. The display period 102 is preferably defined as $$\frac{1}{\text{refresh rate}},$$

where the refresh rate is the refresh rate at which the projection system that includes the binary optical display element refreshes the binary optical display element. The display period 102 is further divided into a number of intervals, where each interval is preferably less than or equal to $$\frac{\text{display period}}{2^{\text{color depth in bits}} - 1}.$$

The color depth in bits specifies the number of different shades of grayscale that the image pixel can have, such that a color intensity value thereof can range from zero through $2^{\text{color depth in bits}}-1$.

Because the optical display element is binary, at any given time it can have one bit loaded therein. Therefore, to achieve rendering of pixels having grayscale shades, each bit of the color intensity value of a pixel is loaded into the binary optical display element one or more times, based on the bit's significance relative to the other bits of the pixel's color intensity value. In one embodiment, where the bits of the color intensity value of the pixel are specified and ordered as i=n-1, i=n-2, i=n-3, . . . , i=0, from the most significant bit to the least significant bit, each bit is loaded into the binary optical display element $2^i$ times during the display period 102. More particularly, in one embodiment, each bit is loaded into the binary optical display element in $2^i$ intervals of the display period 102.

Such an approach to achieving grayscale utilizing a binary optical display element is referred to as binary-weighted pulse-width modulation. FIG. 1A specifically shows a standard binary-weighted bit display distribution approach 100 of such modulation, for an example eight-bit pixel having bits 0 through 7. The approach 100 depicts the order in which bits 0 through 7 are loaded into the binary optical display element during the display period 102 in a weighted manner. That is, the longer the line for a given bit, the more times it is loaded into the binary optical display element during the display period 102. During the display period 102, bits 0 through 7 are loaded into the binary optical display element $2^0,2^1,2^2,2^3,2^4,2^5,2^6$, and $2^7$ times, respectively.

More specifically, in FIG. 1A the display period 102 can have 255 intervals divided into fifteen sub-periods of sixteen consecutive such intervals each, and one sub-period of fifteen consecutive such intervals. In the sub-period 104, which is the sub-period having fifteen consecutive intervals, bit 0 is loaded in the first interval for a total of one time, bit 1 is loaded in the second and third intervals for a total of two times, bit 2 is loaded in the fourth through the seven intervals for a total of four times, and bit 3 is loaded in the eighth through fifteenth intervals for a total of eight times. In the sub-period 106, bit 4 is loaded into sixteen consecutive intervals. In the two sub-periods 108, bit 5 is loaded into thirty-two consecutive intervals, whereas in the four sub-periods 110, bit 6 is loaded into sixty-four consecutive intervals. Finally, in the eight sub-periods 112, bit 7 is loaded into 128 consecutive intervals.

By comparison, FIG. 1B specifically shows a bit-splitting binary-weighted bit display distribution approach 150 of binary-weighted pulse-width modulation, also for an example eight-bit pixel having bits 0 through 7. Where there are 255 intervals in the display period 102, each of the more significant bits 4 through 7 is loaded into the binary optical display element in varying sub-periods of sixteen consecutive intervals each, in the order depicted in FIG. 1B. Bit 4 is loaded in one such sub-period 152E, bit 5 is loaded in two non-consecutive such sub-periods 152A and 152L, bit 6 is loaded in four non-consecutive such sub-periods 152C, 152G, 152J, and 152N, and bit 7 is loaded in eight non-consecutive such sub-periods 152B, 152D, 152F, 152H, 152I, 152K, 152M, and 152O. Each of the less significant bits 0 through 3 is loaded into the binary optical display element in a sub-period 154 of fifteen consecutive intervals, with bit 0 loaded once, bit 1 loaded twice, bit 2 loaded four times, and bit 3 loaded eight times.

The approach 150 of FIG. 1B is a bit-splitting approach for binary-weighted pulse-width modulation because each of the bits of the color intensity value of a pixel is not necessarily loaded in consecutive intervals for the total number of intervals that the bit is to be loaded into the binary optical display device within the display period 102. In this way, the approach 150 of FIG. 1B differs from the approach 100 of FIG. 1A, where each bit is loaded in consecutive intervals for the total number of intervals that it is to be loaded into the binary optical display device within the display period 102. The bit-splitting approach 150 may be employed to reduce visible artifacts from being displayed by the binary optical display device when switching between different pixels over consecutive display periods.

As has been described for an eight-bit color depth, a projection system utilizing binary optical display elements has to load a bit into each binary optical display element for each of 255 intervals of each display period. To achieve a sixty hertz refresh rate, this means that the projection system loads a bit into each binary optical display element every $$\frac{1\times10^6}{60\times255}\cong 65\ \mu\text{s}.$$

To achieve an eighty-five hertz refresh rate, the projection system loads a bit into each binary optical display element every $$\frac{1\times10^6}{85\times255}\cong 46\ \mu\text{s}.$$

This can become burdensome on the projection system, especially for SVGA (800×600), XGA (1024×768), and higher resolutions having 480,000, more than 750,000, or more, pixels, and where each pixel has more than one corresponding binary optical display element.

Optical Display Element Having Multiple-Bit Storage Element

Figure 2:
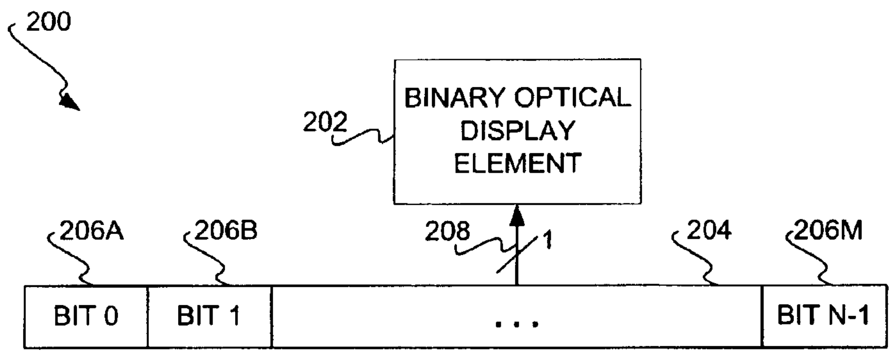
FIG. 2 is a diagram of an optical display element, according to an embodiment of the invention.

FIG. 2 shows an optical display element 200, according to an embodiment of the invention, which relieves a projection system from having to load a bit into the binary optical display element 202 in every interval of every display period. The optical display element 200 includes the binary optical display element 202 and a multiple-bit storage element 204. The optical display element 200 may be an integrated circuit (IC), or another type of electronic and/or electromechanical device.

The binary optical display element 202 may be a micro-electromechanical (MEM) device, such as a digital micro-mirror device (DMD), or another type of binary optical display element. The binary optical display element 202 is binary in that it can be on or off. That is, it can reflect or transmit light, or not reflect or transmit light. As such, it is inherently incapable of displaying pixels having color intensity values of one-bit in length. The element 202 displays pixels having color intensity values of more than one-bit in length by displaying each bit of a color intensity value for at least one of the intervals into which the display period can be divided, based on the significance of the bit relative to the other bits of the pixel's color intensity value, as has been described.

The multiple-bit storage element 204 has a number of bit storage cells 206A, 206B, . . . , 206M corresponding to the number of bits of the color intensity value of the pixel to be displayed by the binary optical display element 202. The color intensity value has N bits, such that the pixel having this value has an N-bit color depth and is capable of having any one of $2^N$ different color intensity values that correspond to different grayscale shades. A color intensity value of zero corresponds to the minimum shade, whereas a color intensity value of $2^N-1$ corresponds to the maximum shade. The storage cells 206A, 206B, . . . , 206M are collectively referred to as the cells 206. The cell 206A corresponds to the least significant bit 0 of the pixel's color intensity value, the cell 206B corresponds to the second-from-least significant bit 1 of this value, and so on, such that the cell 206M corresponds to the most significant bit N-1 of the pixel's color intensity value.

The multiple-bit storage element 204 is coupled to the binary optical display element 202 such that any one of the bits stored by the bit storage cells 206 can be loaded into the binary optical display element 202, as indicated by the line 208. Therefore, the projection system of which the optical display element 200 is a part does not have to load a bit into the binary optical display element 202 during every interval of every display period. Rather, the projection system loads all N bits of the color intensity value of a pixel into the bit storage cells 206 of the multiple-bit storage element 204 during a given display period. The appropriate one of these bits is then loaded into the binary optical display element 202 during every interval of the display period from the multiple-bit storage element.

As a result, rather than having to refresh the binary optical display element 202 with a bit of image data every interval of $$\frac{1}{\text{refresh rate} \times (2^N - 1)} \text{ seconds,}$$

the projection system only has to refresh the multiple-bit storage element 204 with N bits of image data every display period of $$\frac{1}{\text{refresh rate}} \text{ seconds.}$$

This reduces the loading obligation of the projection system by a factor of $2^N$, and thus reduces the burden placed on the projection system in having to refresh the binary optical display element 202. That is, the projection system loads each of the N bits of image data into the multiple-bit storage element 204 once for a given display period, as opposed to loading the N bits of image data into the binary optical display element a total of $2^N-1$ times. The projection system may thus achieve higher refresh rates and/or greater display resolutions.

Figure 3:
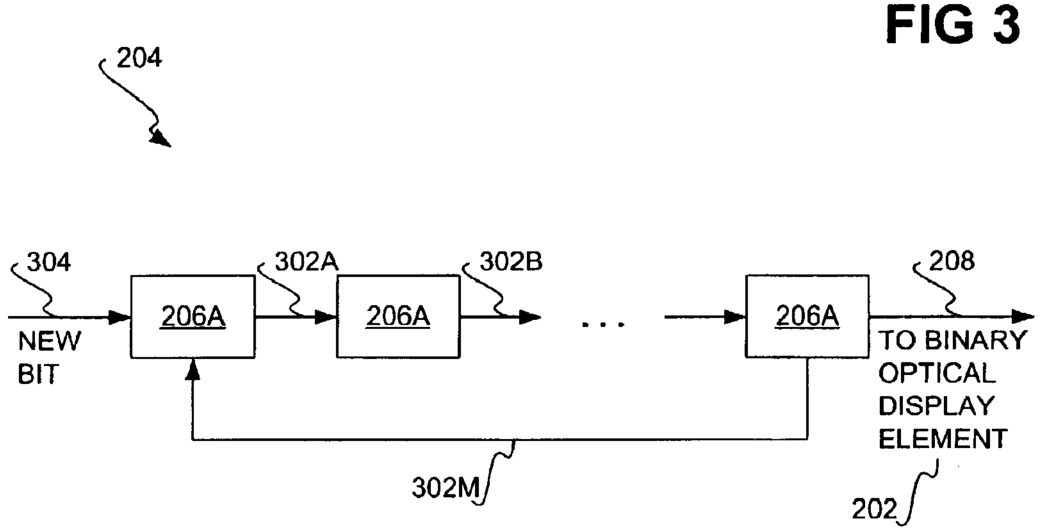
FIG. 3 is a diagram of the multiple-bit storage element of the optical display element of FIG. 2, according to an embodiment of the invention.

FIG. 3 shows the multiple-bit storage element 204 in more detail, according to an embodiment of the invention. The bit storage cells 206 are circularly interconnected, as referenced by the lines 302A, 302B, . . . 302M. That is, the first bit storage cell 206A can output its bit to load the second bit storage cell 206B, as indicated by the line 302A, and so on, and the last bit storage cell 206M can output its bit to load the first bit storage cell 206A, as indicated by the line 302M. The last bit storage cell 206M can also output its bit to load into the binary optical display element, as indicated by the line 208. Furthermore, the first bit storage cell 206A can load a new bit of a color intensity value of a pixel, as indicated by the line 304.

The bit storage cells 206 can be loaded with the bits of a color intensity value of a pixel of image data in one embodiment of the invention as follows. The first, most significant bit of the color intensity value is asserted on the data line 304 to be loaded into the bit storage cell 206A. The second, next most significant bit of the color intensity value is then asserted on the data line 304 to be loaded into the bit storage cell 206A, where the first bit that is already stored in the bit storage cell 206A is output onto the line 302A for loading into the bit storage cell 206B.

This process is repeated for each of the remaining N bits of the color intensity value. Each time, the bit stored by each of the bit storage cells 206 except the last bit storage cell 206M is output for loading into the next successive of the bit storage cells 206, such that the bit stored in the bit storage cell 206A is moved to the bit storage cell 206B, and so on, and the new bit is asserted on the data line 304 for loading into the bit storage cell 206A. After repeating this process N times, the bit storage cells 206A, 206B, . . . , 206M store the bits 0, 1, . . . , N-1 of the bits of the color intensity value of the pixel.

The N bits stored in the bit storage cells 206 are rotated among the bit storage cells 206 as needed during every interval of a display period, so that the appropriate bit is stored by the bit storage cell 206M and output onto the line 208 for loading into the binary optical display element 202. For example, if the bit stored in the bit storage cell 206B is to be loaded into the binary optical display element 202 during a given interval of the display period, the bits stored in the bit storage cells 206 are rotated N-2 times, so that the bit storage cell 206M ultimately stores the bit initially stored in the bit storage cell 206B. In each rotation, the bit stored by each of the bit storage cells 206 except for the bit storage cell 206M is moved to the next successive of the bit storage cells 206. The bit stored by the bit storage cell 206M is moved to the first bit storage cell 206A, so that no bits are lost in the rotation.

Figure 4:
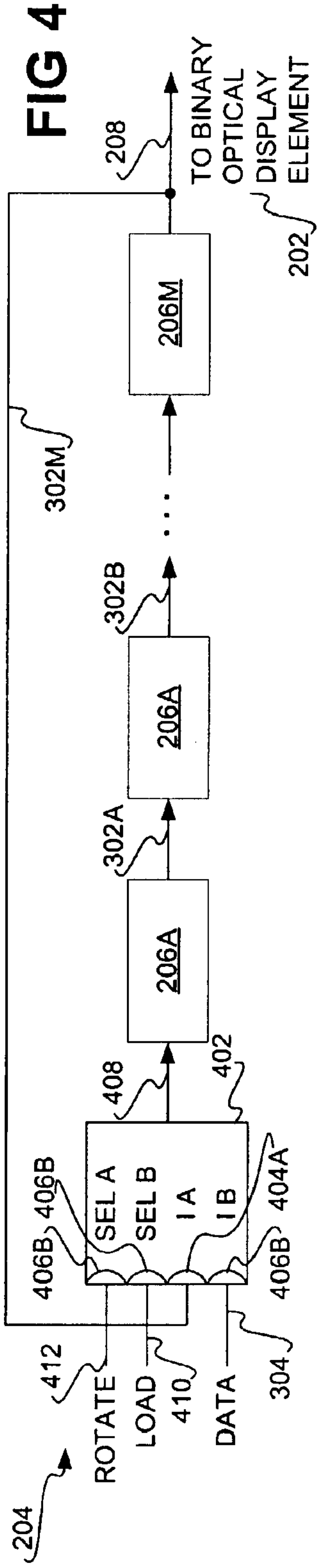
FIG. 4 is a diagram of the multiple-bit storage element of FIG. 3, according to another embodiment of the invention.

FIG. 4 shows the multiple-bit storage element 204 in even more detail, according to another embodiment of the invention. The multiple-bit storage element 204 includes a control cell 402 having input lines 404A and 404B that are selected by assertion of the select lines 406A and 406B, respectively. The input lines 404A and 404B are connected to the line 302M and the data line 304, respectively, whereas the select lines 406A and 406B are connected to a rotate line 412 and a load line 410, respectively. Asserting the load line 410 causes the bit asserted on the data line 304 to be output on the line 408 for loading into the bit storage cell 206A. Asserting the rotate line 412 causes the bit output by the bit storage cell 206M on the line 302M to be output on the line 408 for loading into the bit storage cell 206A.

The bit storage cells 206 are loaded with the bits of a color intensity value of a pixel of image data as follows. The first, most significant bit of the color intensity value is asserted on the data line 304, and the load line 410 is asserted to output the bit onto the line 408 for loading into the bit storage cell 206A. The second, next most significant bit of the color intensity value is then asserted on the data line 304 and the load line 410 is asserted to load the bit into the bit storage cell 206, where the first bit that was previously stored in the bit storage cell 206A is output onto the line 302A for loading into the bit storage cell 206B. This process is repeated for each of the remaining N bits of the color intensity value, such that, as has been described, the bit storage cells 206A, 206B, . . . , 206M ultimately store the bits 0, 1, . . . , N-1 of the bits of the pixel's color intensity pixel. Thus, the bits of the color intensity value are serially loaded into the bit storage cells 206.

The N bits stored in the bit storage cells 206 are rotated among the bit storage cells 206 as needed during every interval of a display period, so that the appropriate bit is stored by the bit storage cell 206M, which is the closest of the bit storage cells 206 to the binary optical display element 202. One of the bits is thus appropriately and selectively output onto the line 208 for appropriate and selective loading into the binary optical display element 202. This process occurs as follows. For each rotation, the rotate line 412 is asserted. This causes the bit stored by the bit storage cell 206M output onto the line 302M to be output on the line 408 for loading into the bit storage cell 206A. The bit previously stored by the bit storage cell 206A is concurrently output onto the line 302A for loading into the bit storage cell 206B, and so on. Depending on which of the bits stored by the bit storage cells 206 is desired to be loaded into the binary optical display element 202, the rotate line 412 is asserted zero through N times.

Figure 5:
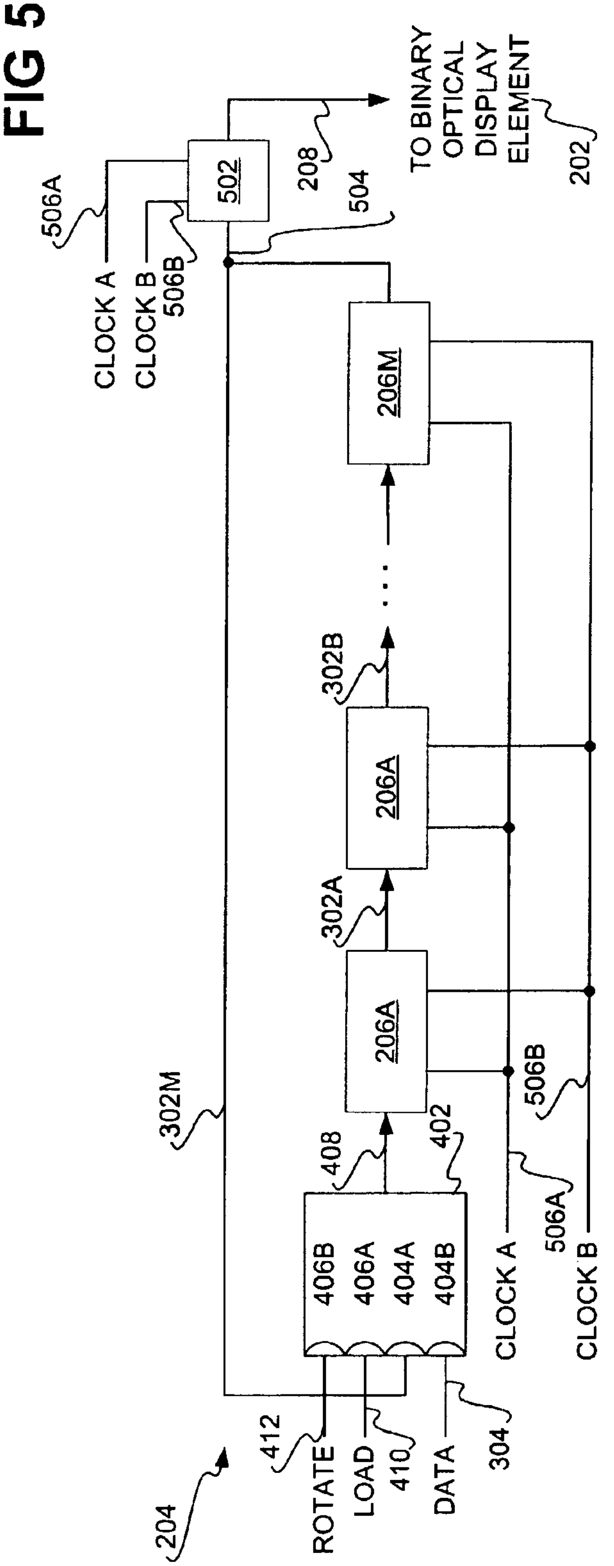
FIG. 5 is a diagram of the multiple-bit storage element of FIG. 3, according to still another embodiment of the invention.

FIG. 5 shows the multiple-bit storage element 204 in more detail, according to still another embodiment of the invention. The multiple-bit storage element 204 includes a mirror storage cell 502 having an input line 504 connected to the line 302M connecting the output of the bit storage cell 206M to the input line 404A of the control cell 402. There are also two clock signals 506A and 506B, collectively referred to as the clock signals 506. The clock signals 506 are non-overlapping, such that one of the clock signals 506 is high when the other is low, and vice-versa. The clock signals 506 are connected to each of the bit storage cells 206, as well as to the mirror storage cell 502, such that they synchronize the bit storage cells 206 and the mirror storage cell 502. The mirror storage cell 502 prevents visible artifacts from being displayed by the binary optical display element 202 when the bit storage cells 206 are being loaded with the bits of a new intensity value, or when the bits stored by the bit storage cells 206 are being rotated and have not reached their final destinations within the bit storage cells 206. The mirror storage cell 502 stores the same bit stored by the last bit storage cell 206M.

The clock signals 506 in one embodiment are timed so that each is high for a different half of a given clock period, which may or may not correspond to an interval of the display period. For example, the clock signal 506A may be high during the first half of each clock period, whereas the clock signal 506B may be high during the second half of each clock period. The load line 410 is asserted for N such intervals to load the N bits of a color intensity value of an image pixel into the bit storage cells 206, with the data line 304 asserted with one of the N bits during each clock period. The rotate line 412 is asserted for a number of clock periods corresponding to how far the desired bit to be loaded into the optical display element 202 is away from the last bit storage cell 206M.

In one embodiment, the bits output by the bit storage cells 206 on the lines 302 are valid on the falling edge of the clock signal 506A, and the rising edge of the clock signal 506B causes each of the bit storage cells 206 except the first bit storage cell 206A to load the bit stored in the previously adjacent of the bit storage cells 206. For example, the bit storage cell 206B loads the bit stored in the bit storage cell 206A on the rising edge of the clock signal 506B. The bit storage cell 206A loads the bit that is output on the line 408, which is the bit output by the bit storage cell 206M on the line 302M where the rotate line 412 is asserted, and is the bit asserted on the data line 304 where the load line 410 is asserted. The mirror storage cell 502 loads the bit input on the input line 504 on the rising edge of the clock signal 506A, and outputs the bit on the line 208 for loading into the binary optical display element 202 on the rising edge of the clock signal 506B.

Figure 6:
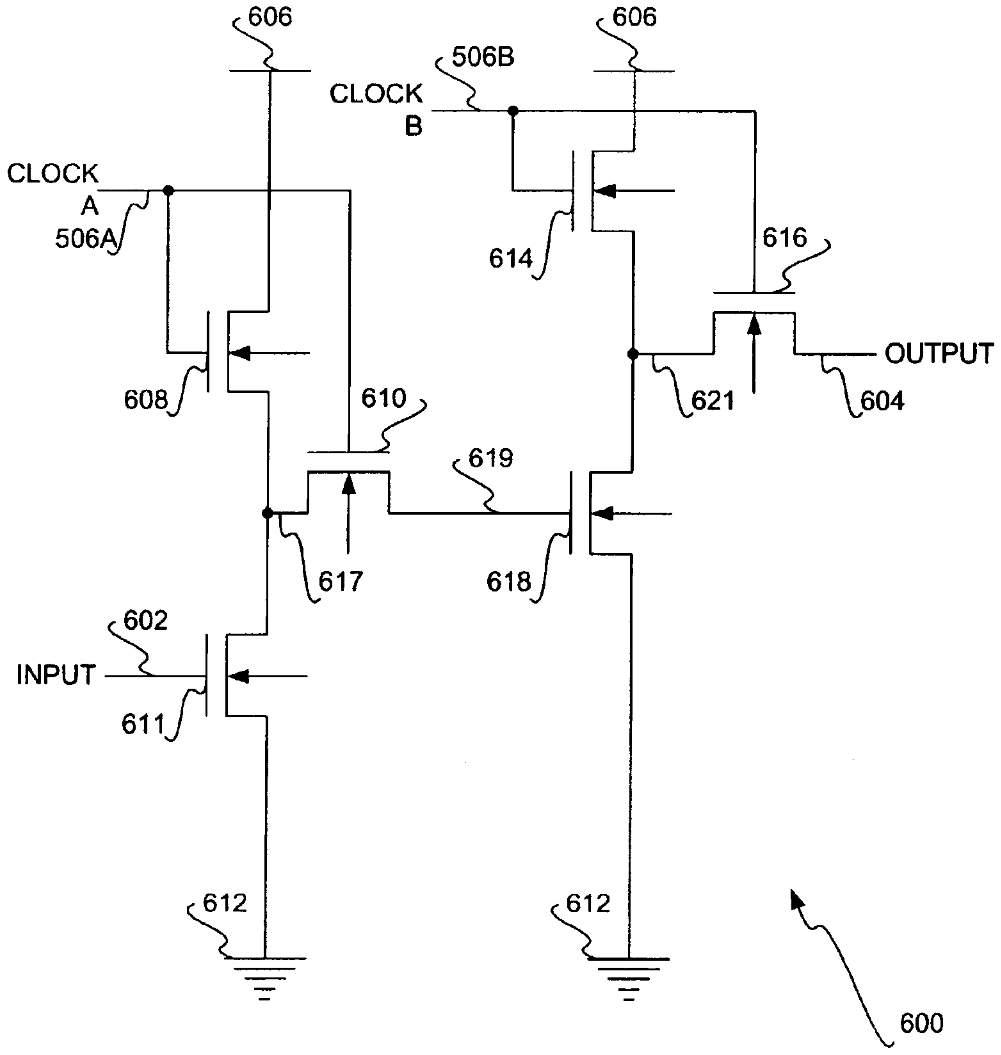
FIG. 6 is a circuit diagram of a bit storage cell, according to an embodiment of the invention.

FIG. 6 shows a bit storage cell 600, according to an embodiment of the invention, which can implement each of the bit storage cells 206. The bit storage cell 600 is implemented using n-channel metal oxide semiconductor (NMOS) logic. The input 602 is the input for the bit storage cell 600, whereas the output 604 is the output for the bit storage cell 600. There are six NMOS transistors 608, 610, 611, 614, 616, and 618. The NMOS transistors 608 and 611 are connected end-to-end from a voltage source 606 to ground 612. Similarly, the NMOS transistors 614 and 618 are connected end-to-end from the voltage source 606 to ground 612. The clock signal 506A controls the transistors 608 and 610, whereas the input 602 controls the transistor 611. The clock signal 506B controls the transistors 614 and 616, whereas the output 619 of the transistor 610 controls the transistor 618. It is noted that other implementations, besides a dynamic NMOS implementation, can be utilized in other embodiments of the invention.

The clock signals 506A and 506B are preferably never low or high at the same time. When the clock signal 506A is high and the clock signal 506B is low, transistors 608 and 610 are on. If the input 602 is high, then the transistor 611 is also on, pulling the input 617 to the transistor 610 low. As the transistor 610 is on, its output 619 is also pulled low. Otherwise, if the input 602 is low, then the transistor 611 is off, allowing the transistor 608 to pull the input 617 to the transistor 610 high. As the transistor 610 is on, its output 619 is also pulled high. When the clock signal 506B is high and the clock signal 506A is low, transistors 614 and 616 are on. If the output 619 of the transistor 610 is high, then the transistor 618 is also on, pulling the input 621 to the transistor 616 low. As the transistor 616 is on, its output 604 is also pulled low. Otherwise, if the output 619 of the transistor 610 is low, then the transistor 618 is off, allowing the transistor 614 to pull the input 621 to the transistor 616 high. As the transistor 616 is on, its output 604 is also pulled high. Thus, where the clock signal 506A is high, the input 602 is loaded into the bit storage cell 600. When the clock signal 506B is high, the output 604 outputs the bit stored in the bit storage cell 600.

Figure 7:
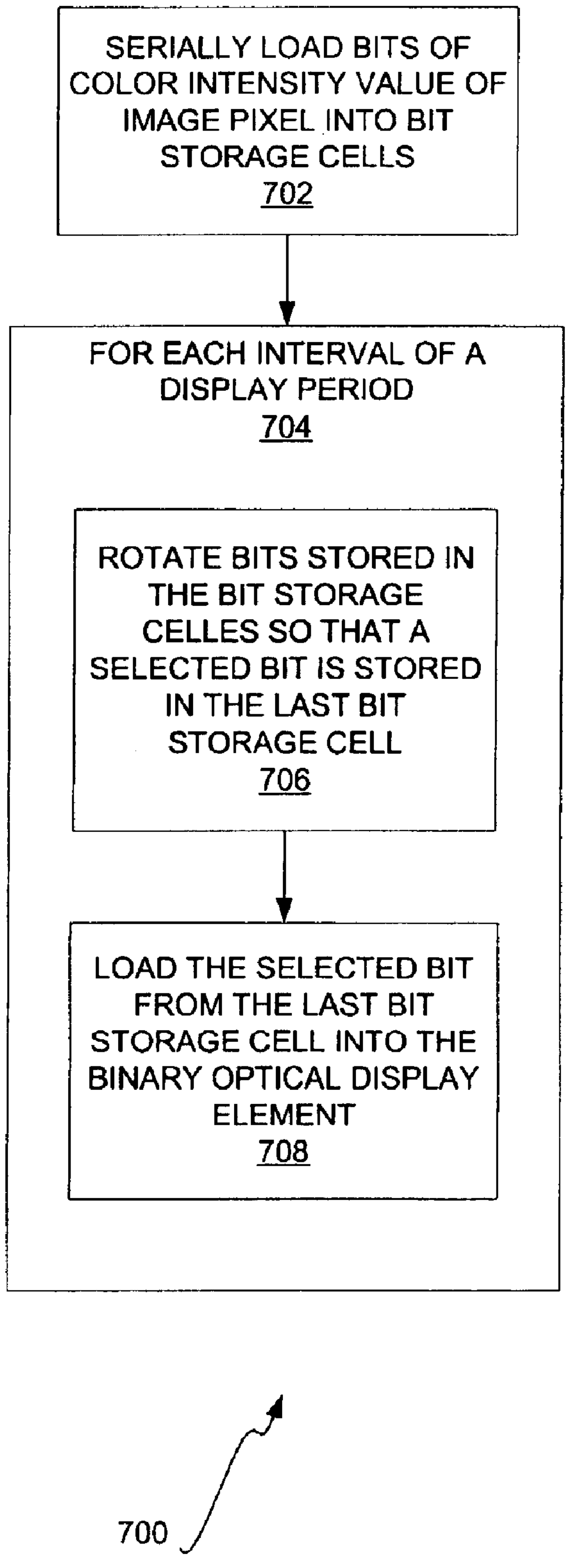
FIG. 7 is a flowchart of a method for using an optical display element having a multiple-bit storage element, according to an embodiment of the invention.

FIG. 7 shows a method 700 for using the multiple-bit storage element 204, according to an embodiment of the invention. First, the N bits of a color intensity value of an image pixel to be displayed by the binary optical display element 202 are serially loaded into the bit storage cells 206 of the multiple-bit storage element 204 (702). This may be accomplished by asserting each bit on the data line 304 and asserting the load line 410 to load the bit into the first bit storage cell 206A, where the bits already stored in other of the bit storage cells 206, except the bit storage cell 206M, are shifted over to the next of the bit storage cells 206.

Next, 706 and 708 are performed for each interval of a display period. The bits stored in the bit storage cells 206 are rotated so that a selected bit is stored in the last bit storage cell 206M (706), which is then loaded therefrom into the binary optical display element 202 (708). Rotation may be accomplished by asserting the rotate line 412 for each desired rotation of the bits among the bit storage cells 206. The selected bit is the bit to be displayed in accordance with a binary-weighted pulse-width modulation approach, such as the approach 100 of FIG. 1A, the bit-splitting approach 150 of FIG. 1B, and so on. The number of rotations performed is the number of rotations needed to cause the selected bit to move from its current bit storage cells of the bit storage cells 206 to the last bit storage cell 206M.

Color Optical Display Element and Display Device

Figure 8A:
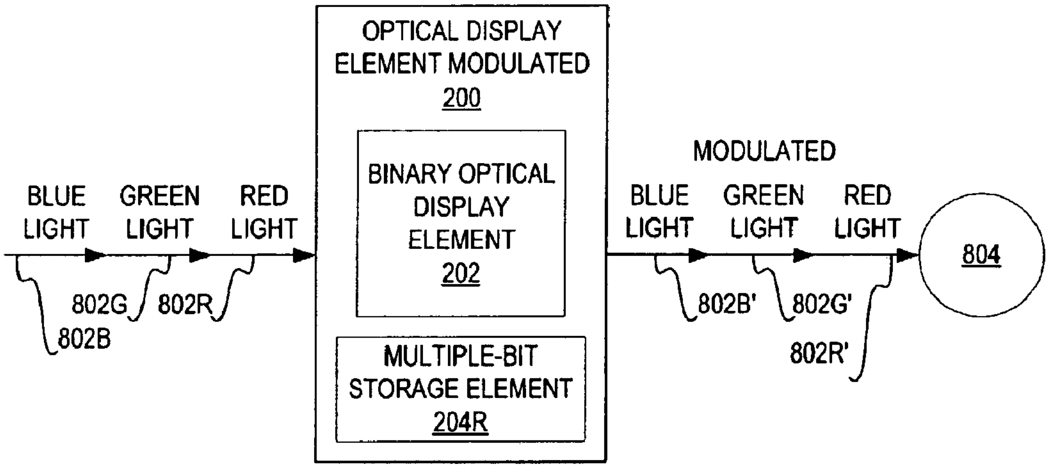
FIGS. 8A and 8B are diagrams of a color optical display element, according to different embodiments of the invention.
Figure 8B:
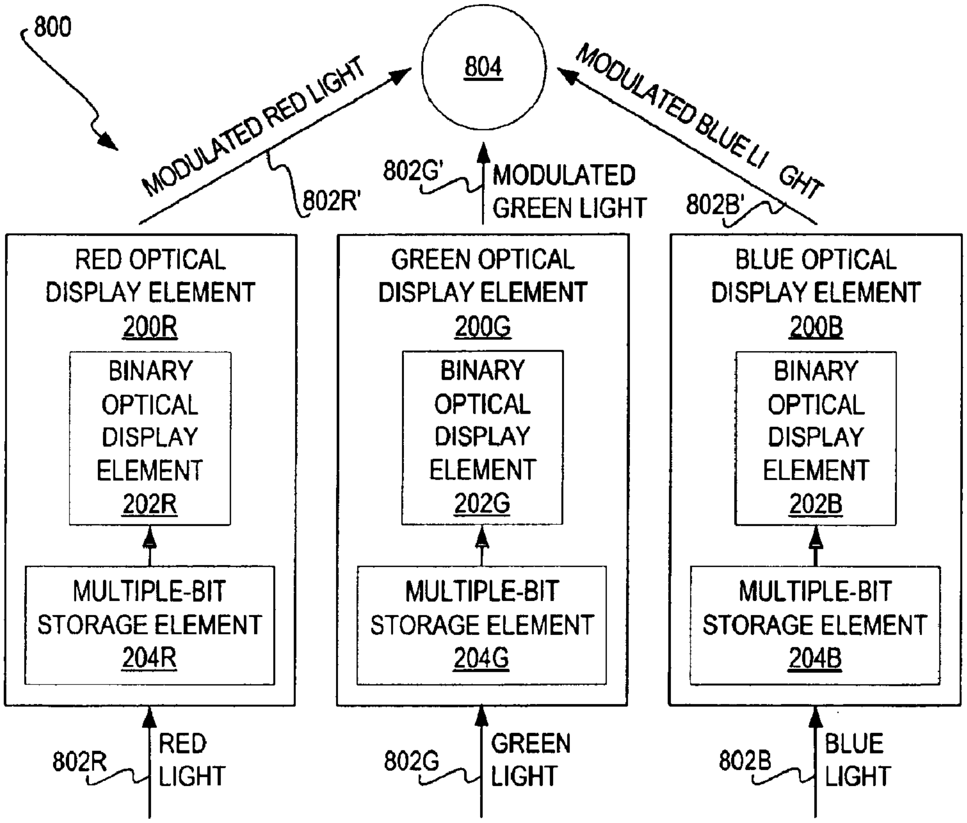

The optical display element 200 that has been described is monochromatic, in that at any given time, it is able to modulate the light to which it is incident without varying the light's color. That is, the optical display element 200 is not able to on its own change the color of light to which it is incident. FIGS. 8A and 8B show a color optical display element 800 that can display different colors, however, according to different embodiments of the invention. The color optical display element 800 in FIG. 8A utilizes a single instantiation of the optical display element 200, whereas the color optical display element 800 in FIG. 8B utilizes a number of instantiations of the optical display element 200 equal to the number of color components of the given color space being used.

In FIG. 8A, the optical display element 200 includes the binary optical display element 202 and the multiple-bit storage element 204, as have been described. Light 802 of varying colors is incident to the optical display element 200. The varying colors correspond to the color components of the given color space being used. For example, where each image pixel of data can be divided into the color components red, green, and blue, corresponding to the red, green, and blue color components of the red, green, and blue (RGB) color space, the light 802 may be divided into red light 802R, green light 802G, and blue light 802B over a given time period. This division may occur through the use of a color wheel, or by another approach. Other light components, such as a white light component, may also be included in the light 802, for instance.

When the red light 802R is incident to the optical display element 200, the bits of the intensity value for the red color component of the image pixel to be displayed are loaded into the multiple-bit storage element 204. The bits are then loaded into the binary optical display element 202 as has been described. The result is modulated red light 802R' incident to a spot 804 on which the image pixel is to be displayed. Similarly, when the green light 802G is incident to the optical display element 200, the bits of the intensity value for the image pixel's green color component are loaded into the multiple-bit storage element 204, and loaded into the binary optical display element 202 as has been described. This results in modulated green light 802G' incident to the spot 804. When the blue light 802B is incident to the optical display element 200, the bits of the intensity value for the pixel's blue color component are loaded into the multiple-bit storage element 204, and loaded into the binary optical display element 202 as has been described, resulting in modulated blue light 802B' incident to the spot 804. To the human eye, the net effect is the display of the image pixel on the spot 804.

In FIG. 8B, the color optical display element 800 includes an optical display element 200 for each of the color components of the given color space being used. For example, for the RGB color space, there is a red optical display element 200R, a green optical display element 200G, and a blue optical display element 200B. The elements 200R, 200G, and 200B include the binary optical display elements 202R, 202G, and 202B, respectively, and the multiple-bit storage elements 204R, 204G, and 204B, respectively. Red light 802R is incident to the optical display element 200R, green light 802G is incident to the optical display element 200G, and blue light 802B is incident to the optical display element 200B.

The bits of the intensity value for the red color component of the image pixel to be displayed are loaded into the multiple-bit storage element 204R. Similarly, the bits of the intensity value for the pixel's green color component are loaded into the multiple-bit storage element 204G, and the bits of the intensity value for the blue color component are loaded into the multiple-bit storage element 204B. These bits are then loaded into the binary optical display elements 202R, 202G, and 202B, respectively, as has been described in relation to the binary optical display element 202 and the multiple-bit storage element 204. The result is modulated red light 802R', modulated green light 802G', and modulated blue light 802B' onto the spot 804 on which the image pixel is to be displayed, effectively displaying the image pixel on the spot 804.

Figure 9:
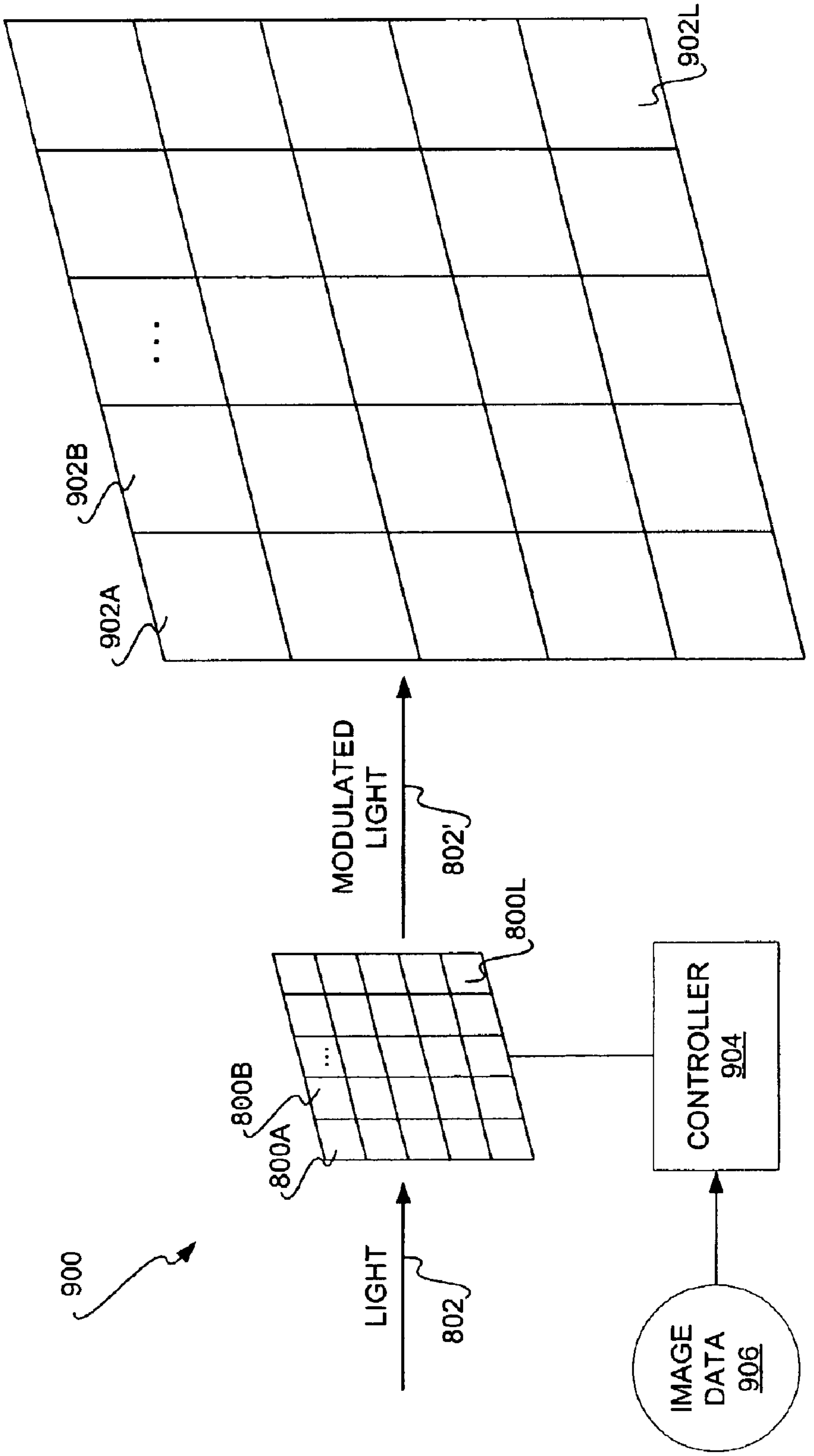
FIG. 9 is a diagram of a display device, according to an embodiment of the invention.

FIG. 9 shows a simplified example of a display device 900, according to an embodiment of the invention. The display device 900 includes a number of the color optical display elements 800A, 800B, . . . , 800L incident to the light 802, each of which is an instantiation of the color optical display element 800 of FIG. 8A or 8B. The display device 900 also includes a controller 904 that receives image data 906 from an image source. The display device 900 may include a screen 902 having screen portions 902A, 902B, . . . , 902N on which the modulated light 802' are displayed, or the screen 902 may be external to the display device 900. That is, the display device 900 may be a front-projection or a rear-projection system. As can be appreciated by those of ordinary skill within the art, the display device 900 may also include components other than those depicted in FIG. 9.

Light 802 is incident to the color optical display elements 800A, 800B, . . . , 800L as has been described in conjunction with FIGS. 8A and 8B. For instance, light of different color may be incident to different parts of each of the elements 800A, 800B, . . . , 800L at the same time, or light of the same color may be incident to the elements 800A, 800B, . . . , 800L at different times. The elements 800A, 800B, . . . , 800L in number preferably correspond to a desired resolution of the display device 900, such as SVGA (800×600) resolution, XGA (1024×768) resolution, or another resolution. The light 802' modulated by the optical display elements 800A, 800B, . . . , 800L is directed to the screen 902. More specifically, the optical display elements 800A, 800B, . . . , 800L output modulated light 802' for display on the corresponding screen portions 902A, 902B, . . . , 902L.

The controller 904 may be hardware, software, or a combination of hardware and software. The controller 904 is receptive to the image data 906 from an image source, such as a video component, a computer, and so on. The controller 904 performs any necessary processing of the image data 906, such as scaling the data 906 to the resolution of the display device 900, converting the data 906 to the color space of the display device 900, and so on. The controller 904 also appropriately loads the bits of the color intensity values of the image pixels of the image data 906, such as the bits of the color intensity values of the color components of these image pixels, into the color optical display elements 800A, 800B, . . . , 800L, as has been described. That is, the controller loads the bits into the elements 800A, 800B, . . . , 800L no more than once for each display period.

The image pixels of the image data 906, as may have been scaled and/or color space converted by the controller 904, correspond to the resolution of the display device 900, and thus to the color optical display elements 800A, 800B, . . . , 800L. Each optical display element 800A, 800B, . . . , 800L is thus responsible for displaying a different one of the pixels of the image data 906. Each element 800A, 800B, . . . , 800L may have a single instantiation of the optical display element 200 that displays all the color components of the image pixel successively, or the only color component of the image pixel where the display device 900 is monochromatic. Alternatively, each element 800A, 800B, . . . , 800L may have a number of instantiations of the optical display element 200 that display all the color components of the image pixel at the same time.

Figure 10:
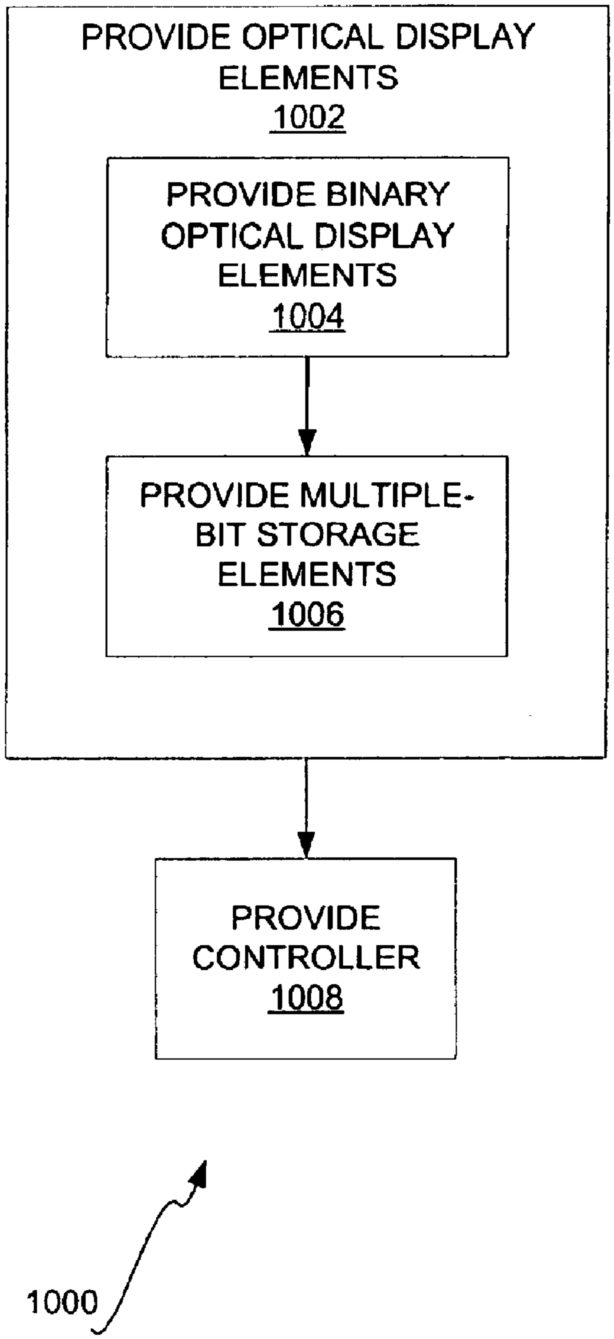
FIG. 10 is a flowchart of a method to at least partially manufacture the display device of FIG. 9, according to an embodiment of the invention.

FIG. 10 shows a method 1000 for at least partially constructing the display device 900, according to an embodiment of the invention. As can be appreciated by those of ordinary skill within the art, the method 100 may include steps and/or acts other than those depicted in FIG. 10. First, a number of optical display elements 800A, 800B, . . . , 800I, corresponding to the resolution of the display device 900, are provided (1002). This can include providing an equal or greater number of instantiations of the binary optical display element 202 (1004), and a number of instantiations of the multiple-bit storage element 204 equal to the number of instantiations of the binary optical display elements 202 (1006). Providing the instantiations of the multiple-bit storage element 204 can include providing corresponding instantiations of the bit storage cells 206, the control cell 402, and/or the mirror storage cell 502. The controller 904 is also provided (1008).

Where the display device 900 is monochromatic, there may be one instantiation of the binary optical display element 202 and one instantiation of the multiple-bit storage element 204 for each of the optical display elements 800A, 800B, . . . , 800L. Where the display device 900 is color, there may still be one instantiation of the binary optical display element 202 and one instantiation of the multiple-bit storage element 204 for each of the optical display elements 800A, 800B, . . . , 800L, corresponding to the color optical display element 800 of the embodiment of FIG. 8A. Alternatively, where the display device 900 is color, there may be one instantiation of the binary optical display element 202 and one instantiation of the multiple-bit storage element 204 in each of the optical display elements 800A, 800B, . . . , 800L, for every color component of the color space of the display device 900, corresponding to the color optical display element 800 of the embodiment of FIG. 8B.

CONCLUSION

It is noted that, although specific embodiments have been illustrated and described herein, it will be appreciated by those of ordinary skill in the art that any arrangement is calculated to achieve the same purpose may be substituted for the specific embodiments shown. This application is intended to cover any adaptations or variations of the present invention. Therefore, it is manifestly intended that this invention be limited only by the claims and equivalents thereof.

We claim:

1. An optical display element comprising:

a binary optical display element; and, a multiple-bit storage element to store a number of bits of a color intensity value to be displayed by the binary optical display element during a display period, each bit loaded from the multiple-bit storage element into the binary optical display element one or more times during the display period to achieve the color intensity value, and the multiple-bit storage element having a number of bit storage cells equal to the number of bits of the color intensity value.

2. The optical display element of claim 1, wherein the multiple-bit storage element further comprises a mirror storage cell connected to the binary optical display element.

3. The optical display element of claim 1, wherein the number of bit storage cells are circularly interconnected.

4. The optical display element of claim 3, wherein the multiple-bit storage element further comprises a control cell having a load line that is asserted to load a next bit of the number of bits of the color intensity value into the multiple-bit storage element and a rotate line that is asserted to rotate the number of bits among the number of bit storage cells.

5. The optical display element of claim 3, wherein a closest bit storage cell of the number of bit storage cells to the binary optical display element stores a bit of the number of bits of the color intensity value to be loaded next into the binary optical display element, such that the number of bits are rotated among the number of bit storage cells to select the bit to be loaded next into the binary optical display element.

6. The optical display element of claim 1, wherein one of the number of bits of the color intensity value is loaded from the multiple-bit storage element into the binary optical display element during each interval of the display period.

7. The optical display element of claim 6, wherein the interval of the display period is a multiple of the display period divided by two to the power of the number of bits of the color intensity value minus one.

8. The optical display element of claim 6, wherein each bit is loaded into the binary optical display element a number of times based on a significance of the bit relative to other of the number of bits of the color intensity value.

9. The optical display element of claim 8, wherein the number of bits of the color intensity value are loaded into the binary optical display element in accordance with a binary-weighted pulse-width modulation approach.

10. The optical display element of claim 8, wherein the number of bits of the color intensity value are loaded into the binary optical display element in accordance with a bit-splitting binary-weighted pulse-width modulation approach.

11. The optical display element of claim 1, wherein the number of bits of the color intensity value are serially loaded into the multiple-bit storage element.

12. The optical display element of claim 1, wherein the binary optical display element is a micro-electromechanical (MEM) device.

13. The optical display element of claim 1, wherein the binary optical display element is a digital micromirror device (DMD).

14. The optical display element of claim 1, wherein the optical display element is an integrated circuit (TC).

15. An optical display element comprising:

a binary optical display element; and, means for storing a number of bits of a color intensity value to be displayed by the binary optical display element without loading the number of bits thereinto more than once during a display period, the means having a number of bit storage cells equal to the number of bits of the color intensity value.

16. The optical display element of claim 15, wherein the means selectively loads each bit of the number of bits of the color intensity value into the binary optical display element at least once during the display period.

17. The optical display element of claim 15, wherein the means selectively loads each bit of the number of bits of the color intensity value into the binary optical display element a number of times based on a significance of the bit relative to other of the number of bits of the color intensity value.

18. The optical display element of claim 15, wherein the binary optical display element in at least one of: a micro-eletromechanical (MEM) device and a digital micromirror device (DMD).

19. A color optical display element comprising:

a plurality of binary optical display elements corresponding to color components of a color to be displayed by the color optical display element; and, a plurality of multiple-bit storage elements, each multiple-bit storage element corresponding to one of the plurality of binary optical display elements and storing a number of bits of an intensity value of a different color component of the color to be displayed by the color optical display element during a display period, each bit stored by each multiple-bit storage element loaded from the multiple-bit storage element into one of the plurality of binary optical display elements during the display period to achieve, the color, wherein each bit of the number of bits of each multiple-bit storage element is loaded into one of the plurality of binary optical display elements during each interval of the display period equal to a multiple of the display period divided by two to the power of the number of bits of the intensity value minus once.

20. The optical display element of claim 19, wherein each bit of the number of bits of each multiple-bit storage element is loaded into one of the plurality of binary optical display elements a number of times based on a significance of the bit relative to other of the number of bits of the intensity value.

21. The optical display element of claim 19, wherein each binary optical display element is at least one of: a micro-electromechanical (MEM) device and a digital micromirror device (DMD).

22. The optical display element of claim 19, wherein the color components of the color to be displayed by the color optical display element are red, green, and blue.

23. A display device comprising:

a plurality of binary optical display elements; and, a multiple-bit storage element for each binary optical display elements to store a number of bits of a color intensity value of an image pixel to be displayed by the binary optical display element without loading the number of bits into the multiple-bit storage element more than once during a display period, the multiple-bit storage element having a number of bit storage cells equal to the number of bits of the color intensity value.

24. The display device of claim 23, wherein the plurality of binary optical display components corresponds to a plurality of image pixels to be displayed thereby, such that each multiple-bit storage element stores the number of bits of a color intensity value of one of the plurality of image pixels.

25. The display device of claim 23, wherein a plurality of color image pixels to be displayed by the plurality of binary optical display components each corresponds to a number of the plurality of binary optical display components, including a binary optical display component to display each of a plurality of color components of the color image pixel, such that each multiple-bit storage element stores the number of bits of a color intensity value of one color component of one of the plurality of color image pixels.

26. The display device of claim 23, wherein each multiple-bit storage element selectively loads each bit of the number of bits of the color intensity value into a binary optical display element at least once during the display period.

27. The display device of claim 23, wherein each multiple-bit storage element selectively loads each bit of the number of bits of the color intensity value into a binary optical display element a number of times based on a significance of the bit relative to other of the number of bits of the color intensity value.

28. The display device of claim 23, wherein each binary optical display element is at least one of: a micro-electromechanical (MEM) device and a digital micromirror device (DMD).

29. A method comprising:

during each of a plurality of display period intervals of a display period, rotating a number of bits of a color intensity value as stored in an equal number of circularly interconnected bit storage cells among the number of storage cells so that a selected bit to be displayed by a binary optical display element in the display period interval is stored in a given bit storage cell of the number of bit storage cell; and, loading the selected bit from the selected bit storage cell into the binary optical display element to display the selected bit in the display period interval.

30. The method of claim 29, further initially comprising serially loading the number of bits of the color intensity value into the number of bit storage cells.

31. The method of claim 30 wherein serially loading the number of bits into the number of bit storage cells comprises, for each bit to be loaded, asserting the bit on a data line and asserting a load line to load the bit into a first bit storage cell of the number of bit storage cells.

32. The method of claim 29, wherein rotating the number of bits of the color intensity value as stored in the number of bit storage cells comprises asserting a rotate line once for each desired rotation of the number of bits among the number of bit storage cells.

33. The method of claim 29 wherein rotating the number of bits of the color intensity value as stored in the number of bit storage cells comprises rotating the number of bits as stored in the number of bit storage cells so that the selected bit to be displayed by the binary optical display element in the display period interval is selected in accordance with a binary-weighted pulse-width modulation approach.

34. The method of claim 29, wherein rotating the number of bits of the color intensity value as stored in the number of bit storage cells comprises rotating the number of bits as stored in the number of bit storage cells so that the selected bit to be displayed by the binary optical display element in the display period interval is selected in accordance with a bit-splitting binary-weighted pulse-width modulation approach.

35. A method comprising:

providing a plurality of binary optical display elements for each of one or more of at least one color component of each of a plurality of image pixels; and, providing a multiple-bit storage element for each binary optical display element to store a number of bits of a color intensity value of the color component of the binary optical display element to be displayed by the binary optical display element, each bit loaded from the multiple-bit storage element into the binary optical display element one or more times during a display period to achieve the color intensity value, the multiple bit-storage element having a number of bit storage cells equal to the number of bits of the color intensity value.

36. The method of claim 35, wherein providing the plurality of binary optical display elements comprises providing a plurality of binary optical display elements for each of a plurality of monochromatic image pixels.

37. The method of claim 35, wherein providing the plurality of binary optical display elements comprises providing a plurality of binary optical display elements for each of a red color component, a green color component, and a blue color component of each of the plurality of image pixels.

38. The method of claim 35, wherein providing the multiple-bit storage element for each binary optical display element comprises at least one of:

providing a mirror storage cell connected to the binary optical display element; and, providing a control cell having a load line that is asserted to load a next bit of the number of bits of the color intensity value into the multiple-bit storage element and a rotate line that is asserted to rotate the number of bits among the number of bit storage cells of the multiple-bit storage element.

* * * * *

UNITED STATES PATENT AND TRADEMARK OFFICE

CERTIFICATE OF CORRECTION

PATENT NO. : 6,888,657 B2
DATED : May 3, 2005
INVENTOR(S) : Barbour et al.

It is certified that error appears in the above-identified patent and that said Letters Patent is hereby corrected as shown below:

Column 12,
Line 63, delete "(TC)." and insert -- (IC). --.

Column 14,
Line 32, delete "cell;" and insert -- cells; --.
Line 39, delete "30" and insert -- 30, --.

Signed and Sealed this

Seventeenth Day of January, 2006

JON W. DUDAS
*Director of the United States Patent and Trademark Office*